April 2, 1940.                    W. FEINBLOOM                    2,196,066
                                  CONTACT LENS
                              Filed March 2, 1938                2 Sheets-Sheet 1

WILLIAM FEINBLOOM
INVENTOR.

BY
ATTORNEYS

April 2, 1940.   W. FEINBLOOM   2,196,066
CONTACT LENS
Filed March 2, 1938    2 Sheets-Sheet 2

WILLIAM FEINBLOOM
INVENTOR.

BY
ATTORNEYS

Patented Apr. 2, 1940

2,196,066

UNITED STATES PATENT OFFICE 2,196,066

CONTACT LENS

William Feinbloom, New York, N. Y.

Application March 2, 1938, Serial No. 193,521

2 Claims. (Cl. 88—54.5)

The present invention relates to contact lenses.

Heretofore, commercial contact lenses have been of two general types, the ground lenses and the blown lenses. Both of these types are made entirely of glass. The ground contact lenses were made with both the corneal and scleral portions spherical and were fitted from test series in which the radii of the scleral rims of the different lenses varied by predetermined steps. In the vast majority of cases, these ground lenses are unsatisfactory because only a small number of eyes are spherical in the scleral area and placing a spherical contact glass on a non-spherical eye causes local irritation so that the glass cannot be tolerated.

The second general type of commercial contact lens is the blown lens. These lenses are blown against a model of the eye which is built up empirically by a trial and error method. The contact glasses of this type are thus expensive and difficult to produce. A further difficulty of these blown lenses is that the optical properties of the corneal section cannot be accurately controlled and any attempt at subsequent grinding adds grave technical difficulties and greatly increases the expense.

Two other forms are also known but neither has had any commercial application. One of these forms is a contact lens molded entirely from "Cellon" or Celluloid and due to the optical disadvantages as well as the manufacturing difficulties and excessive mold costs, this form has never come into commercial use. The other non-commercial form consists of a glass or Celluloid corneal section mounted in a flexible scleral rim of Celluloid or rubber. For various reasons this lens has never come into commercial use. First of all, neither Celluloid nor rubber will stand up well in the eye. Then, too, mere flexibility will not permit the scleral rim to stretch to fit eyes of different size. Furthermore, the degree of flexibility is dependent on many factors and, where the tolerances are as small as they are in the eye, a comfortable lens would be difficult, if not impossible, to reproduce.

Another method of fitting contact lenses is disclosed and claimed in my copending application Serial No. 72,970 filed April 6, 1936, for Contact lenses which has matured into Patent No. 2,129,304 of Sept. 6, 1938. According to this latter method, a mold is made from an impression of the eye and a contact lens having a moldable scleral rim is formed by means of this mold. While very accurate and comfortable contact lenses can be produced by this method, the fact that each lens is an individual job throughout, makes the method somewhat troublesome to practice.

I have found, however, that a very large percentage of eyes can be comfortably fitted with contact lenses from a test series in which the scleral rims are made in toric form rather than the spherical form of the ground type of contact lens.

This present application is a continuation in part of my copending case Serial No. 72,970 filed April 6, 1936 for Contact lenses.

An object of the present invention is to provide a test series of toric contact lenses. A further object is to provide a new and improved contact lens. A still further object is to provide a corrected contact lens. These and other objects and advantages reside in certain novel features of construction, arrangement and combination of parts and processes as will hereinafter be more fully set forth and pointed out in the appended claims.

Referring to the drawings.

Figure 1:
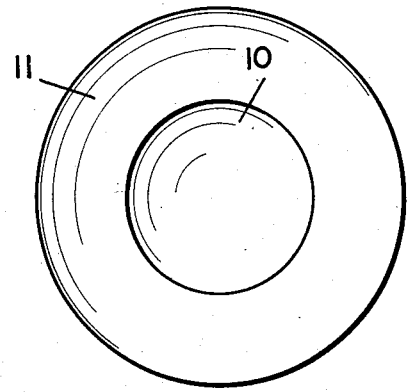
Fig. 1 is a rear view of a contact lens or bowl embodying the present invention.
Figure 2:
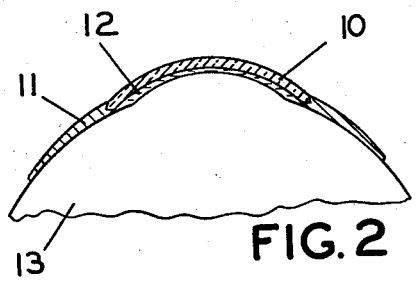
Fig. 2 is a central section thereof, showing the lens in position on the eye.

According to the present invention, the contact glass or lens shown in Figs. 1 and 2 consists of a corneal lens portion 10 and a scleral rim portion 11. The corneal lens portion 10 is preferably formed of glass and is ground and polished to such a curve that, together with the layer of saline solution 12 between it and the eye 13, it will provide the desired correction for the eye 13.

The scleral rim 11 is adapted to rest on the sclera of the eye 13 to hold the lens 10 in position before the cornea. As pointed out in my above-mentioned copending application Serial No. 72,970 filed April 6, 1936, this scleral rim 11 is independent and distinct from the corneal lens 10, is separately formed and the lens 10 and rim 11 can therefore be formed to unrelated curves.

The scleral rim 11 is preferably molded or pressed to its desired form and it can be composed of a wide variety of materials. These materials must conform to the following conditions: there must be no surface deterioration or sensible change in shape when exposed to a half normal saline solution at one hundred degrees Fahrenheit; there must be no injurious products given off when the material is boiled in a half normal saline solution; the material must be molded at reasonable temperatures and pressures; the material must be rigid in thin (one-half millimeter) sections; and the material must be capable of taking a high polish.

A large number of substances can be readily selected to fulfill these conditions. For example, a large number of synthetic resins are usable. The polyvinyl resin sold under the trade name Vydon, the pyroxylin resin sold under the trade name Hecolite, the cellulose acetate resin sold under the trade name Superez, the polystyrene resin sold under the trade name Tepperite, and the polyacrylic acid resin sold under the trade name Kallodent, could be used in this way. These resins are of the general type known as thermoplastic and, while they can be used, they are not the most desirable materials because of the temperature and pressure needed for proper molding. Urea resins such as those sold under the trade names of Plaskon and Beetle, are satisfactory from a molding standpoint but in their present form, the urea odor makes them undesirable.

I prefer to use a thermosetting resin of the phenol formaldehyde type. One resin of this type which has been tried and found satisfactory, is the resin sold by the Bakelite Corporation under the identification number XR-10247. This resin has all of the desired properties and its ease of molding makes it preferable.

Figure 9:
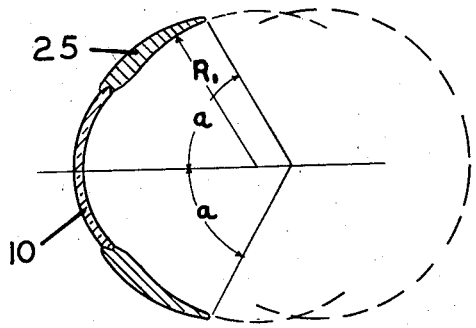
Fig. 9 is a vertical section of the lens of Fig. 8.
Figure 10:
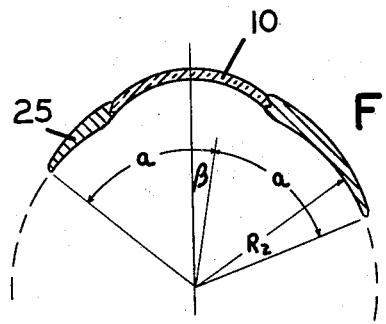
Fig. 10 is a horizontal section thereof.

From experience, I have found that there are five main factors affecting the fitting qualities of contact lenses. These are:

1. The overall size of the lens. This size is preferably an angular measure and, in Figs. 9 and 10, would be twice the angle α measured from the center of the torus.

2. The position of the corneal section with respect to the scleral rim. This position is also preferably determined by an angular measure and is indicated by the angle β in Fig. 10.

3. The amount the rear surface of the corneal section is spaced from the contacting surface of the scleral rim. This distance is preferably measured from the edge 26 of the rear surface of the corneal lens section 10 to the point directly below on the continued curve of the contacting surface 29 of the scleral rim 25. This distance is designated as S in Fig. 11.

4. The radius of curvature of the scleral part of the lens in the vertical meridian. That is, R₁ in Fig. 9.

5. The radius of curvature of the scleral part of the lens in the horizontal meridian. That is, R₂ in Fig. 10.

Other factors, such as the radius of curvature of the inner surface of the corneal section and the smallest diameter of the contacting surface of the scleral rim, also affect the fit but the five outlined above are the principal ones.

Of course, a test series could be made in which each of the above factors is varied independently but the large number of necessary lenses makes such a series a practical impossibility. I have found that by selecting values for the first three variables, overall size, corneal lens position and corneal lens spacing, and by varying the horizontal and vertical radii of the scleral rim in predetermined steps throughout the series, a test series can be made which is significantly more effective than any method of fitting known to the prior art. In other words, such a series will satisfactorily fit a much higher percentage of patients than any other known method of fitting.

The values selected for the first three variables are not necessarily the same throughout the series, but each combination of radii of the scleral rim has its own particular size, corneal lens position and corneal lens spacing. The particular values selected are to be determined by experiment. For example, a small eye having a radius of curvature of 12 mm. may, in the majority of cases, require a contact lens of a smaller overall size than a large eye having a radius of curvature of 15 mm. Likewise, it may be found that in one or more combinations of radii, a corneal lens centered in the scleral rim is more satisfactory while in other cases, the majority of patients require contact lenses in which the corneal section is decentered in the scleral rim. The corneas of some sizes of eyes may usually run higher than those of other eyes and in such an event, the contact lenses in these sizes would be made with a greater corneal spacing.

After fitting a large number of patients satisfactorily, I have found certain values of the first three variables to be satisfactory in a considerable percentage of cases. The angle α can be fixed at a value between 55° and 65°. Usually it is preferable to have this angle as large as possible since by distributing the pressure over a larger area, the contact lens is less apt to cause irritation. The angle β can be fixed at a value between 8° and 12°. It would be preferable for manufacturing reasons to fix the angle β at zero to form a centered lens as in Fig. 1 but I have found such a large proportion of patients requiring decentered lenses, that I prefer to use decentered lenses throughout the series. The spacing S can be fixed at a value between 0.25 mm. and 0.75 mm. for a large proportion of cases.

The values given in the preceding paragraph are by no means restrictive and are given merely by way of example. Knowing the factors to be varied in predetermined steps and knowing the ones to be fixed by experiment, anyone skilled in the art can prepare an adequate test set.

Figures 3, 7:
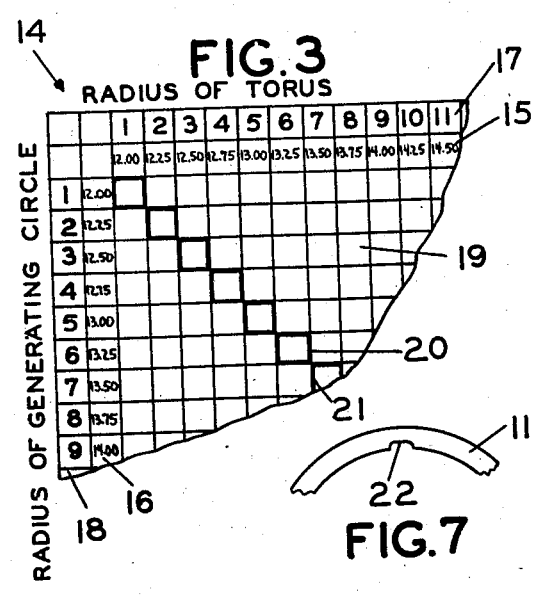
Fig. 3 shows a portion of the chart for the test series.
Fig. 7 is a section taken on line 7, 7 of Fig. 4.

Fig. 3 shows a chart designating the radii of the rims of lenses of a test series made in accordance with this invention. The lenses of this test series are made in toric form and on the chart 14, the vertical columns designate the radius of the torus R₁ while the horizontal rows designate the radius of the generating circle R₂. The numbers in the row 15 and column 16 are the numerical values of the radii and the figures in the row 17 and column 18 are merely empirical designations of these numerical values. Thus the lens represented by the square 19 could be designated as an 8 x 3 lens more conveniently than as a 13.75 by 12.50 spindle toric lens.

The lenses designated by the chart 14 are made to both the spindle toric form and the ring toric form. The lenses above and to the right of the line 20 being spindle toruses and those below and to the left of the line 21 being ring toruses. The contact lenses designated by the squares between lines 20 and 21 are spheres. Both the test and finished lenses will preferably have a rim of uniform size so that they can be used on either eye and the axis will be indicated on the finished lens. Of course, it is not necessary to provide the entire series of both spindle and ring toruses and the test set could comprise toruses of only one type. However, since these two types of torus are quite different in the quadrants, it may be that a spindle torus would fit a particular eye comfortably while the ring torus would not.

The chart 14 gives only the curves of the scleral rims 11. Preferably, the lenses 10 will be the same for the entire test series, that is, they will have the same power and the same dimensions.

In fitting contact lenses or bowls from this set, the refractionist by trial selects the contact bowl whose scleral rim 11 properly fits the eye. With this test lens in place, the eye is refracted to determine the proper power for the corneal lens 10. The eye is also preferably examined with a slit lamp or the like to determine the proper clearance between the lens 10 and the cornea of the eye, as set forth in my application Serial No. 87,577 filed June 26, 1936, for Method of and means for making contact lenses, which has matured into Patent No. 2,178,873 of Nov. 7, 1939. A lens 10 having the proper power is then secured in a rim 11 so that there will be the proper clearance between the lens 10 and the cornea. A suitable method for making this contact lens is disclosed in my above-mentioned application Serial No. 72,970 filed April 6, 1936.

After a proper and comfortable fit is obtained by means of the test series, it is essential that the prescription contact lens be nearly as possible an exact duplicate of the contact lens of the test series. Referring to Figs. 8, 9, 10 and 11, a construction is shown in which the contact lens is made to exact reproducible dimensions. In these figures, the corneal lens 10 is decentered in a molded plastic rim 25. The angles $\alpha$ and $\beta$ determining the overall size and the amount of decentration can be readily determined.

Figure 11:
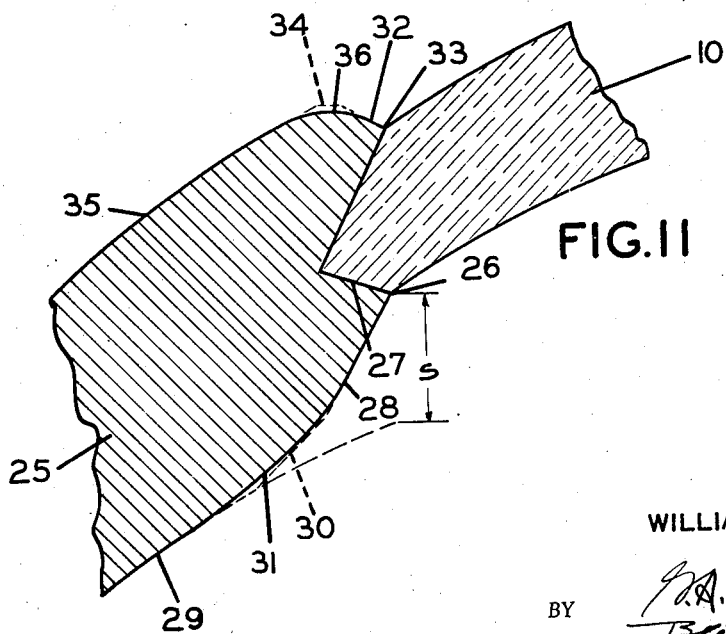
Fig. 11 is an enlarged section showing the construction of the joint between the lens and rim.

Fig. 11 shows in enlarged section the structure of the joint between the lens 10 and the rim 25. On the interior of the contact lens, the plastic rim 25 is ground away on a 60° cone from the point where the edge 26 of the bevel 27 joins the plastic. This conical surface is designated at 28. A 90° cone is then ground on the rim 25 joining the surface 28 and the contacting surface 29 of the rim. This 90° conical surface is designated at 30. The surfaces 28, 29 and 30 are then polished into a smooth surface substantially as indicated at 31.

On the outer surface of the contact lens a 60° conical surface 32 is formed from the point where the edge 33 of the bevel 27 joins the plastic rim 25. A flat surface 34 is then formed joining the conical surface 32 and the outer surface 35 of the scleral rim 25. The surfaces 32, 34 and 35 are then polished down to form the smooth surface 36. The outside of the joint is constructed in this way to prevent the formation of a so-called "feather edge" which might warp away from the bevel 27 of the lens 10 and irritate the eyelids.

The constructional details recited in the preceding paragraphs are not to be taken as restrictive but are given merely as indicating one method of construction. It is obvious that these details such as angles, locations and distances can be varied through relatively wide limits within the scope of this disclosure.

It may be that a test lens conforms in general shape to the eye but either fits too tightly or cuts down the flow of lachrymal or other fluids of the eye. In such a case it is necessary to reduce the area of contact between the scleral rim 11 and the eye 13 in the manner set forth generally in my copending application Serial No. 97,092 filed August 21, 1936, for Contact lenses which has matured into Patent No. 2,129,305 of Sept. 6, 1938. As shown in Figs. 4 to 7, I prefer to form grooves or depressions in the scleral rim 11 and these can be formed either by locally modifying the mold used to make the scleral rim 11 or by grinding out parts of the finished rim.

Figures 4, 5:
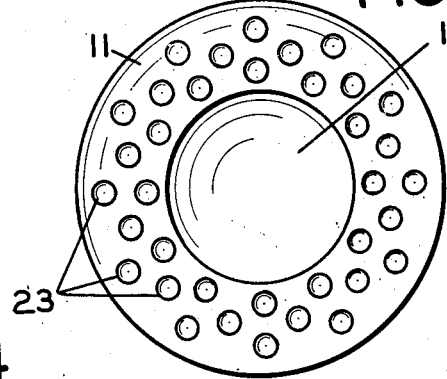
Figs. 4, 5 and 6 are rear views of contact lenses modified to change the area of contact on the eye.
Figure 6:
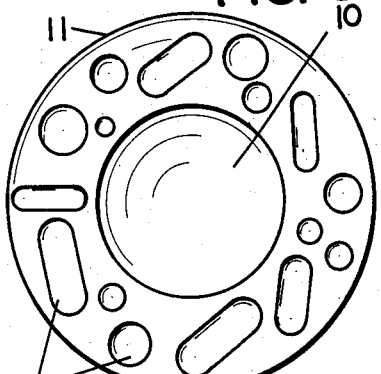
Figure 8:
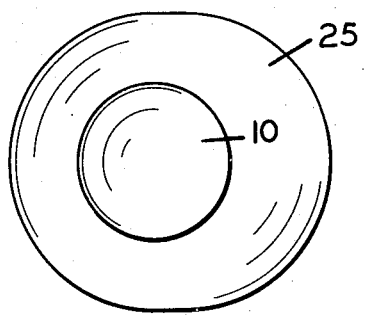
Fig. 8 is a front view of a decentered contact lens.

In the form shown in Fig. 4, the rim 11 is formed with a series of grooves 22 which extend radially to points adjacent the edge of the rim 11. The rim 11 of the lens shown in Fig. 5 has a plurality of staggered circular depressions 23 while the rim 11 shown in Fig. 6 is provided with a plurality of random grooves and depressions 24. Only the area between these grooves or depressions comes into contact with the eye and a comparison of Fig. 1 with Figs. 4, 5 and 6 shows how the area of contact is reduced.

From the foregoing it will be apparent that I am able to attain the objects of my invention and provide a new and improved contact lens. While I have stated that the phenol formaldehyde resin is preferred for the scleral rim of my new contact lens, the requirements of the lens are set forth and other resins or similar substances can be used with equivalent results. Various modifications of my invention can, of course, be made without departing from the spirit of my invention or the scope of the appended claims.

I claim:

1. A test series of contact lenses each comprising a corneal lens and a curved scleral rim, the corneal lenses being of substantially the same size, power and curvature throughout the series and located in substantially the same relative positions in the scleral rims, the scleral rims being of substantially the same size throughout the series and having their radii of curvature varied in substantially uniform increments independently in the vertical and horizontal meridians.

2. A test series of contact lenses each having a corneal lens and a toric scleral rim, each corneal lens in the series having substantially the same size, curvature and power and being located in substantially the same relative position in a scleral rim and with substantially the same build up, the scleral rims in the series being of substantially the same size, the radii of the toric rims in the two meridians being varied independently by small, substantially uniform increments throughout the series.

WILLIAM FEINBLOOM.